(12) United States Patent
Irazabal

(10) Patent No.: US 12,481,703 B2
(45) Date of Patent: Nov. 25, 2025

(54) SHARD HASHING FOR DATABASE OBJECTS WITHIN A DISTRIBUTED DATABASE

(71) Applicant: International Business Machines Corporation, Armonk, NY (US)

(72) Inventor: Jeronimo Irazabal, Buenos Aires (AR)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 16/834,891

(22) Filed: Mar. 30, 2020

(65) Prior Publication Data
US 2021/0303633 A1    Sep. 30, 2021

(51) Int. Cl.
*G06F 16/901*    (2019.01)
*H04L 9/06*    (2006.01)
*H04L 9/00*    (2022.01)

(52) U.S. Cl.
CPC ...... *G06F 16/9027* (2019.01); *G06F 16/9014* (2019.01); *H04L 9/0643* (2013.01); *H04L 9/50* (2022.05)

(58) Field of Classification Search
CPC .......................... G06F 16/9027; G06F 16/9014
USPC ........................................................ 707/797
See application file for complete search history.

(56) References Cited

U.S. PATENT DOCUMENTS

| | | | | |
|---|---|---|---|---|
| 5,832,487 | A * | 11/1998 | Olds ....................... | G06F 16/27 |
| 7,356,549 | B1 * | 4/2008 | Bruso ................. | G06F 16/2246 |
| | | | | 707/696 |
| 9,009,199 | B2 * | 4/2015 | Asmundsson ...... | G06F 16/2246 |
| | | | | 707/797 |
| 9,122,741 | B1 * | 9/2015 | McAlister ........... | G06F 16/2228 |
| 9,177,079 | B1 * | 11/2015 | Ramachandran ... | G06F 16/9027 |
| 9,256,659 | B1 * | 2/2016 | Willett ..................... | G06F 16/20 |
| 9,286,003 | B1 * | 3/2016 | Hallak .................. | G06F 16/137 |
| 9,329,940 | B2 * | 5/2016 | Baptist ................ | G06F 11/1076 |
| 9,342,406 | B2 * | 5/2016 | Grube .................. | G06F 11/1004 |
| 9,606,858 | B2 * | 3/2017 | Resch .................... | G06F 11/10 |
| 9,680,655 | B2 * | 6/2017 | Ryan ....................... | G06F 21/45 |
| 10,193,696 | B2 * | 1/2019 | Struttmann ........... | H04L 9/3242 |
| 10,235,090 | B1 * | 3/2019 | Baruch ............... | G06F 11/1471 |
| 10,289,631 | B2 | 5/2019 | Madisetti et al. | |
| 10,338,972 | B1 * | 7/2019 | Acheson ............... | G06F 9/5077 |

(Continued)

FOREIGN PATENT DOCUMENTS

| | | | | |
|---|---|---|---|---|
| CN | 109791542 A | * | 5/2019 | ......... G06F 16/2255 |
| EP | 3313020 A1 | * | 4/2018 | ............. H04L 67/22 |
| WO | WO-2008014002 A2 | * | 1/2008 | ............. G06F 21/64 |

OTHER PUBLICATIONS

Poon et al., The bitcoin lightning network: Scalable off-chain instant payments.

(Continued)

*Primary Examiner* — Tony Mahmoudi
*Assistant Examiner* — Michael Le
(74) *Attorney, Agent, or Firm* — CHIP LAW GROUP

(57) ABSTRACT

An example operation may include one or more of storing an object across a plurality of shards of a database, generating a sequence of local hash values from the plurality of shards based on respective object content stored locally within the plurality of shards, converting the sequence of local hash values from the plurality of shards into a global hash value for the database, and storing an identifier of the object paired with the global hash value in the database.

11 Claims, 7 Drawing Sheets

(56) References Cited

U.S. PATENT DOCUMENTS

| | | | | |
|---|---|---|---|---|
| 10,379,890 | B1* | 8/2019 | Mehta | G06F 11/3006 |
| 10,592,153 | B1* | 3/2020 | Subramaniam | G06F 3/061 |
| 10,656,857 | B2* | 5/2020 | Hallak | G06F 3/061 |
| 11,030,187 | B1* | 6/2021 | Boodman | G06F 16/285 |
| 11,036,677 | B1* | 6/2021 | Grunwald | G06F 21/78 |
| 11,036,762 | B1* | 6/2021 | Bruck | G06F 16/2228 |
| 11,074,244 | B1* | 7/2021 | Mritunjai | G06F 16/2477 |
| 11,106,708 | B2* | 8/2021 | Lu | G06F 16/325 |
| 2001/0034839 | A1* | 10/2001 | Karjoth | H04L 9/3236 |
| | | | | 713/176 |
| 2005/0021287 | A1* | 1/2005 | Rjaibi | G06F 16/284 |
| | | | | 702/180 |
| 2005/0038784 | A1* | 2/2005 | Zait | G06F 16/22 |
| | | | | 707/999.005 |
| 2005/0114666 | A1* | 5/2005 | Sudia | G06F 21/645 |
| | | | | 713/175 |
| 2006/0059333 | A1* | 3/2006 | Gentry | H04L 63/0823 |
| | | | | 713/156 |
| 2006/0116989 | A1* | 6/2006 | Bellamkonda | G06F 16/24556 |
| 2008/0133906 | A1* | 6/2008 | Parkinson | H04L 9/3263 |
| | | | | 713/156 |
| 2010/0146003 | A1* | 6/2010 | Bruso | G06F 16/2246 |
| | | | | 707/E17.044 |
| 2010/0281013 | A1* | 11/2010 | Graefe | G06F 16/2246 |
| | | | | 707/715 |
| 2011/0185253 | A1* | 7/2011 | Resch | G06F 11/1076 |
| | | | | 714/755 |
| 2012/0047284 | A1* | 2/2012 | Tarkoma | H04L 69/04 |
| | | | | 709/247 |
| 2012/0310916 | A1* | 12/2012 | Abadi | G06F 16/24542 |
| | | | | 707/713 |
| 2012/0330954 | A1* | 12/2012 | Sivasubramanian | |
| | | | | G06F 9/5061 |
| | | | | 707/E17.089 |
| 2013/0246431 | A1* | 9/2013 | Ahuja | G06F 16/358 |
| | | | | 707/E17.089 |
| 2013/0275774 | A1* | 10/2013 | Maheshwari | H04L 63/0428 |
| | | | | 713/193 |
| 2014/0025607 | A1* | 1/2014 | Wang | G06F 16/9027 |
| | | | | 706/12 |
| 2014/0046909 | A1* | 2/2014 | Patiejunas | G06F 16/24554 |
| | | | | 707/687 |
| 2014/0090023 | A1* | 3/2014 | Hu | H04W 12/02 |
| | | | | 726/4 |
| 2014/0149794 | A1* | 5/2014 | Shetty | H04L 67/1095 |
| | | | | 714/20 |
| 2015/0066857 | A1* | 3/2015 | Dayal | G06F 16/128 |
| | | | | 707/639 |
| 2015/0143136 | A1* | 5/2015 | Barney | H04L 9/3242 |
| | | | | 713/193 |
| 2015/0347453 | A1* | 12/2015 | Shetty | G06F 16/182 |
| | | | | 709/213 |
| 2016/0239529 | A1* | 8/2016 | Bulkowski | G06F 16/278 |
| 2016/0378824 | A1* | 12/2016 | Li | G06F 16/24532 |
| | | | | 707/715 |
| 2017/0024428 | A1* | 1/2017 | Patiejunas | G06F 16/2365 |
| 2017/0300490 | A1* | 10/2017 | Kachemir | G06F 7/24 |
| 2018/0039671 | A1* | 2/2018 | Yang | G06F 16/24549 |
| 2018/0089041 | A1* | 3/2018 | Smith | H04L 9/3239 |
| 2018/0276269 | A1* | 9/2018 | Rasscevskis | G06F 16/273 |
| 2018/0300350 | A1* | 10/2018 | Mainali | G06F 16/9027 |
| 2018/0322161 | A1* | 11/2018 | Horii | H04L 9/50 |
| 2018/0336263 | A1* | 11/2018 | Bensberg | G06F 16/284 |
| 2019/0018984 | A1 | 1/2019 | Setty et al. | |
| 2019/0034507 | A1* | 1/2019 | Duttagupta | G06F 16/1752 |
| 2019/0149320 | A1* | 5/2019 | Keselman | H04L 9/0861 |
| | | | | 380/279 |
| 2019/0182313 | A1* | 6/2019 | Yoo | H04L 67/1097 |
| 2019/0188086 | A1* | 6/2019 | Maeda | G06F 11/1453 |
| 2019/0199515 | A1* | 6/2019 | Carver | G06F 16/27 |
| 2019/0273617 | A1* | 9/2019 | Maher | H04L 9/0844 |
| 2019/0303234 | A1* | 10/2019 | Chella | G06F 9/4843 |
| 2019/0334726 | A1* | 10/2019 | Kelly | H04L 9/3247 |
| 2019/0334920 | A1* | 10/2019 | Kelly | H04L 9/3239 |
| 2019/0349426 | A1* | 11/2019 | Smith | H04L 9/3239 |
| 2019/0349733 | A1* | 11/2019 | Nolan | H04L 45/20 |
| 2019/0363874 | A1* | 11/2019 | Shirley | G06Q 20/3827 |
| 2019/0370241 | A1* | 12/2019 | Miraldo | G06F 16/1824 |
| 2019/0392047 | A1* | 12/2019 | Sorenson, III | G06F 16/2255 |
| 2020/0004851 | A1* | 1/2020 | Lambov | G06F 16/2255 |
| 2020/0057865 | A1* | 2/2020 | Yan | G06F 16/245 |
| 2020/0084041 | A1* | 3/2020 | Xu | H04L 63/123 |
| 2020/0104294 | A1* | 4/2020 | Alas | G06F 16/2365 |
| 2020/0127833 | A1* | 4/2020 | Konda | H04L 9/0643 |
| 2020/0153627 | A1* | 5/2020 | Wentz | H04L 9/3218 |
| 2020/0201679 | A1* | 6/2020 | Wentz | G06F 9/5044 |
| 2020/0320340 | A1* | 10/2020 | Wentz | G06N 20/00 |
| 2020/0322159 | A1* | 10/2020 | Xu | G06F 17/18 |
| 2020/0356566 | A1* | 11/2020 | Ransil | G06F 16/2228 |
| 2020/0372015 | A1* | 11/2020 | Baird, III | G06F 16/9024 |
| 2021/0019326 | A1* | 1/2021 | Rauch | H04L 9/3236 |
| 2021/0021426 | A1* | 1/2021 | Scherrer | H04L 63/123 |
| 2021/0049156 | A1* | 2/2021 | Lu | G06F 3/0608 |
| 2021/0049157 | A1* | 2/2021 | Lu | G06F 16/27 |
| 2021/0117274 | A1* | 4/2021 | Federwisch | G06F 3/0683 |
| 2021/0117276 | A1* | 4/2021 | Federwisch | G06F 3/065 |
| 2021/0273807 | A1* | 9/2021 | Wertheim | G06F 9/466 |
| 2021/0288971 | A1* | 9/2021 | Karlberg | G06F 21/10 |
| 2023/0054245 | A1* | 2/2023 | Wright | H04L 9/50 |

OTHER PUBLICATIONS

Croman et al. "On scaling decentralized blockchains." International Conference on Financial Cryptography and Data Security. Springer, Berlin, Heidelberg, 2016.

Lesnikov, "Shard X - blockchain API with MPC signing" Technical Whitepaper, date not available.

Luu et al. "A secure sharding protocol for open blockchains." Proceedings of the 2016 Acm Sigsac Conference on Computer and Communications Security. ACM, 2016.

Poon et al., The bitcoin lightning network: Scalable off-chain instant payments Jan. 14, 2016.

Wahab, "Privacy in Blockchain Systems." arXiv preprint arXiv:1809. 10642 (2018).

Wang et al. "SoK: Sharding on Blockchain." Proceedings of the 1st ACM Conference on Advances in Financial Technologies. ACM, 2019.

Zamani et al., "Rapidchain: Scaling blockchain via full sharding." Proceedings of the 2018 Acm Sigsac Conference on Computer and Communications Security. ACM, 2018.

No. Author. "Amazon Quantum Ledger Database (QLDB)", https://web.archive.org/web/20200324133504/https://aws.amazon.com/qldb/, Mar. 24, 2020, 3 pages, https://web.archive.org/web/20200324133504/https://aws.amazon.com/qldb/.

No. Author. "Meet BigchainDB", The Blockchain Database, Mar. 6, 2020, 7 pages, https://web.archive.org/web/20200306143659/https://www.bigchaindb.com/.

* cited by examiner

SHARD HASHING FOR DATABASE OBJECTS WITHIN A DISTRIBUTED DATABASE

TECHNICAL FIELD

This application generally relates to data storage, and more particularly, to a process of generating cryptographic proof of an object that is stored among multiple shards of a database.

BACKGROUND

Horizontal partitioning is a database architecture in which storage components (e.g., tables, etc.) are stored on separate/multiple partitions rather than a single partition. Each partition may be referred to as a shard. A database shard may be place on separate hardware/server instance. This enables the distribution of the database and its content over a plurality of machines thereby improving performance. For example, a data object may be replicated and stored on multiple shards within the database. As another example, a data object may be divided into sub-objects and spread out/dispersed among different shards within the database.

Meanwhile, blockchain systems store data on an immutable ledger, provide distributed and decentralized access to the immutable ledger through non-trusting participants, establish consensus requirements for agreement between the non-trusting participants such that no one entity can change the immutable ledger without agreement from others, invoke smart contracts, and the like. A blockchain is typically formed by a network of participants which agree to add a block (with data stored therein) to the immutable ledger. Before being added, the block is linked to a previous block on the immutable ledger thereby forming a chain. This immutable and incorruptible nature of blockchain makes it safe from falsified information and hacks. The decentralized nature also gives it the unique quality of being trustless, in that parties do not need to establish trust before they can transact safely.

SUMMARY

One example embodiment may provide an apparatus that includes one or more of a storage configured to store an object across a plurality of shards of a database, and a processor configured to one or more of generate a sequence of local hash values from the plurality of shards based on respective object content stored locally within the plurality of shards, convert the sequence of local hash values from the plurality of shards into a global hash value for the database, and store an identifier of the object paired with the global hash value in the database.

Another example embodiment may provide a method that includes one or more of storing an object across a plurality of shards of a database, generating a sequence of local hash values from the plurality of shards based on respective object content stored locally within the plurality of shards, converting the sequence of local hash values from the plurality of shards into a global hash value for the database, and storing an identifier of the object paired with the global hash value in the database.

A further example embodiment may provide a non-transitory computer readable medium comprising instructions, that when read by a processor, cause the processor to perform one or more of storing an object across a plurality of shards of a database, generating a sequence of local hash values from the plurality of shards based on respective object content stored locally within the plurality of shards, converting the sequence of local hash values from the plurality of shards into a global hash value for the database, and storing an identifier of the object paired with the global hash value in the database.

DETAILED DESCRIPTION

Figure 1:
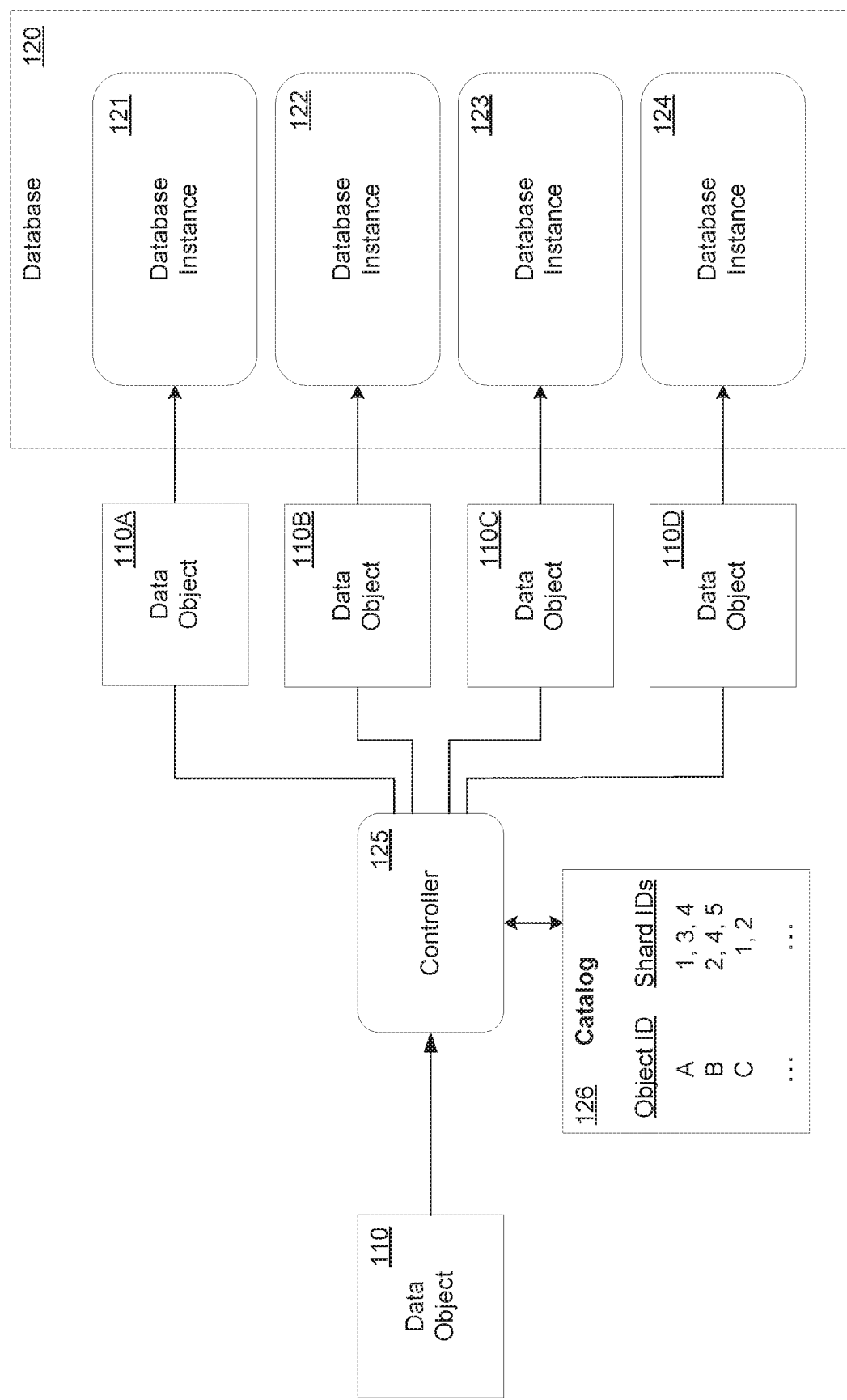
FIG. 1 is a diagram illustrating a process of storing data among multiple shards in a database according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Sharding is a database partitioning scheme which separates larger databases into smaller, faster, and more easily managed partitions referred to as shards. Sharding essentially breaks up database into smaller horizontal storage components. Shards/partitions may be isolated from each other. For example, a database may be spread across multiple database server instances. Each database server instance may hold its own shard. As a non-limiting example, a database may be sharded by splitting the database based on geography. Customers located in a geographic location may be assigned a database server instance that is closest to that geographic location from among multiple geographic instances.

When a new data object/item is stored to the database, the data object may be distributed and stored on a plurality of shards. In some embodiments, an instance of the data object may be stored in its entirety on multiple shards. As another example, the data object may be broken up into smaller fragments and distributed across multiple shards. It is not necessary for a data object to be stored on all shards of a database. For example, the data object may be stored on a subset of shards, but not all shards.

The example embodiments provide a database which can generate cryptographic proof of data object that has been distributed across multiple shards of a database. In some embodiments, the database may store data in key-value pairs, however the embodiments are not limited thereto. For example, a document may be stored as a set of key-value pairs within the database. When stored, the key-value pairs may be spread across multiple shards. To generate cryptographic proof, the example embodiments may generate a sequence of local hash values based on the content stored on the multiple shards.

For example, the database may identify which shards participate in storage of the data object. The database may generate a local hash value for a shard based on the content stored in each shard. Here, the database may assign key-values in the shard to leaf nodes of a hash tree and rollup the hash tree to generate a root hash. The rollup may be performed by combining the hash values on the leaf nodes of the tree in pairs to generate a next level of hashes in the tree. This process may be repeated until, and hash values combined in pairs, until only one hash value remains (i.e., a root hash). The root hash of the shard hash tree may be used as the local hash value of the shard.

The database may combine the local hash values of the plurality of shards in sequence to generate a global hash value for the data object. For example, the database may assign the local hash values to leaf nodes in another hash tree, referred to as a global hash tree. The database may rollup the global hash tree by combining the local hash values in the tree in pairs to generate a next level of the tree. This process may be repeated until only one hash value remains in the global hash tree (e.g., a global root hash).

According to various embodiments, blockchain attributes can be embedded within a horizontal database architecture. For example, a document or other object may be stored within multiple shards of the database. A cryptographic proof may be generated based on local hash values from the shards which are combined into a sequence of hashes. The sequence of local hashes can then be used to generate a global hash. The global hash represents hashed content from all shards where the data object is stored within the database.

Some of the benefits of embedding the blockchain attributes with the horizontal database architecture include improved security of the database. For example, when a data object is accessed, the database may perform a verification of the data object thereby proving the authenticity of the data object. For example, the database may receive an object ID and a global hash of the object. The database may identify the shards associated with the object ID, and reconstruct the global hash based on local hashes from the identified shards. The database may then ensure that the reconstructed global hash matches the received local hash.

FIG. 1 illustrates a process 100 of storing a data object among horizontal shards in a database 120 according to example embodiments. Referring to FIG. 1, the database 120 includes a plurality of database server instances 121, 122, 123, and 124. Each database server instance may 121-124 store a horizontal partition of data (shard) of the database 120. In some cases, data may be replicated and stored on multiple shards or split-up and fragmented and distributed among multiple shards. The database server instances 121-124 may include communication interfaces (e.g., wired, wireless, etc.) for communicating with each other. For example, the database server instances 121-124 may send requests among themselves to identify where data is stored. A user, application, device, etc., may query any of the database server instances 121-124 and receive information about and access to data stored anywhere in the database 120.

In the example of FIG. 1, a data object 110 is stored among multiple shards of the database 120. For example, then the data object 10 is uploaded, the data object 110 may be replicated and stored on a subset of database server instances. In this example, the data object 110 is replicated and stored on the plurality of database server instances 121-124. A controller 125 may manage where the data object 110 is stored on the database 120 and keep a record of which shards the data object is stored within a catalog 126. The data object 110 may include any type of data such as a file, a document, a video, an image, and the like. By storing the data on multiple database server instances 121-124, the data is easy to access and resistant to data loss. For example, if one database server instance goes down, the data object may still be available from another database server instance.

Figure 2:
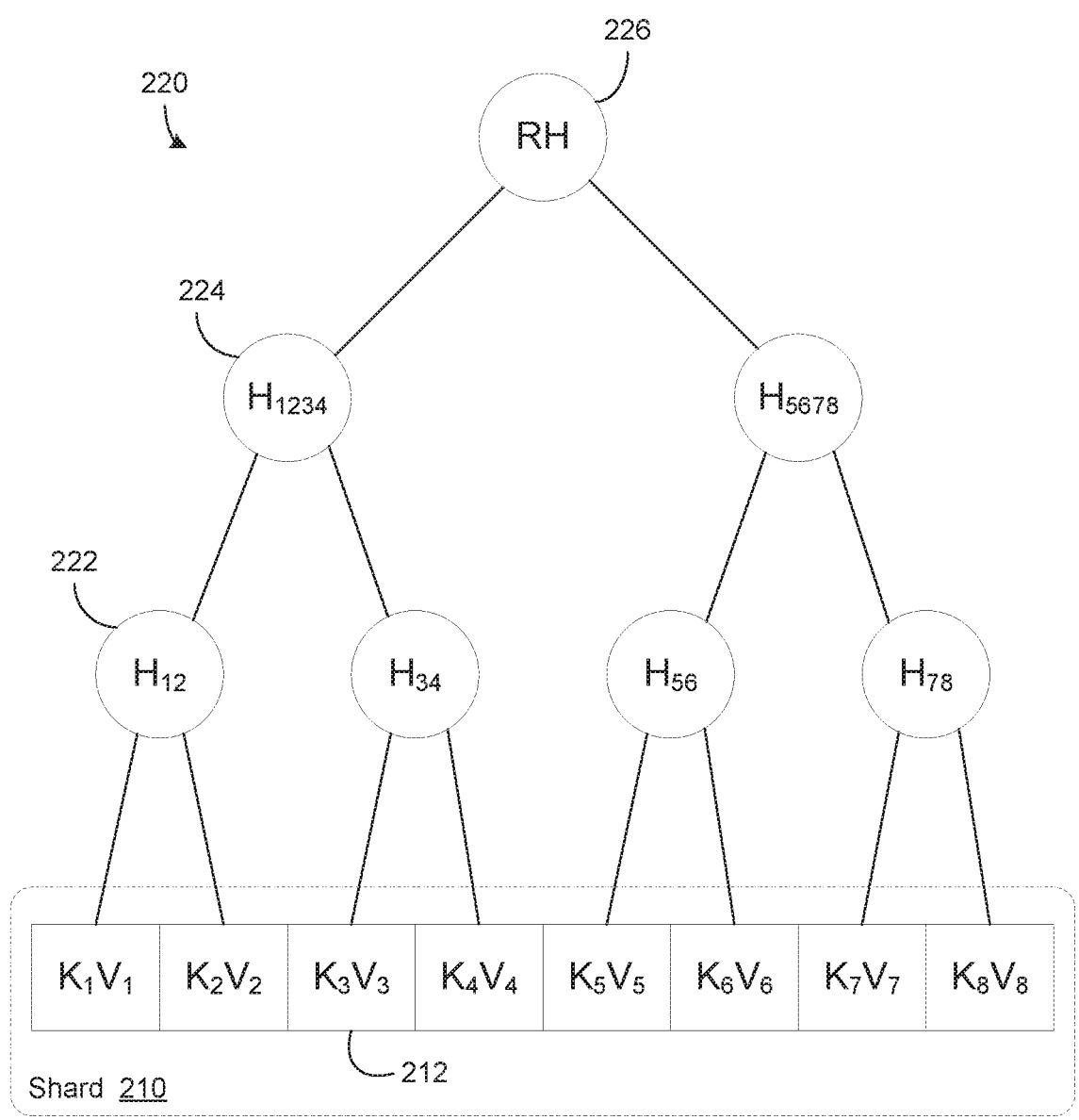
FIG. 2 is a diagram illustrating a process of generating a local hash value from a database shard according to example embodiments.

FIG. 2 illustrates a process 200 of generating a local hash value from a database shard 210 according to example embodiments. Referring to FIG. 2, the process 200 uses a hash tree 220 to generate a local hash value of data content stored within the shard 210. In this example, the shard 210 stores data in key-value pairs 212, however, embodiments are not limited thereto. For example, the shard 210 have a log-structured merge-tree format in which data initially starts in a MemTable in RAM and is subsequently stored to a sorted string table (SSTable) in disk. As another example, the shard 210 have a format of a b-tree, or the like. Within the shard 210, a respective key uniquely identifies a respective data item within the file. Meanwhile, the respective value paired with the key can be a byte array, data structure, binary large object (BLOB), text, numeral, or the like.

In this example, it is assumed that a data object of interest is stored within the shard 210. To generate a local hash value for the shard 210, the database may hash the key-value pairs and assign them to leaf nodes in the hash tree 220. In this example, two key-value pairs are assigned to each of the leaf nodes 222 of the hash tree 220. However, in other examples, the key-value pairs may be individually assigned to leaf nodes, or the like. To generate a single hash value for the shard 210, the hash values of the key-value pairs are rolled up until only one hash value remains (i.e., a root hash 226). In this example, the hash of key-value pairs 1 and 2 is combined with the hash of key-value pairs 3 and 4, and then hashed, to create an intermediate hash 224. Likewise, the hash of key-value pairs 5 and 6 is combined with the hash of key-value pairs 7 and 8, and then hashed, to generate another intermediate hash. The two intermediate hashes are then combined and hashed to generate the root hash 226. The root hash 226 represents the local hash value for the shard 210.

Figure 3:
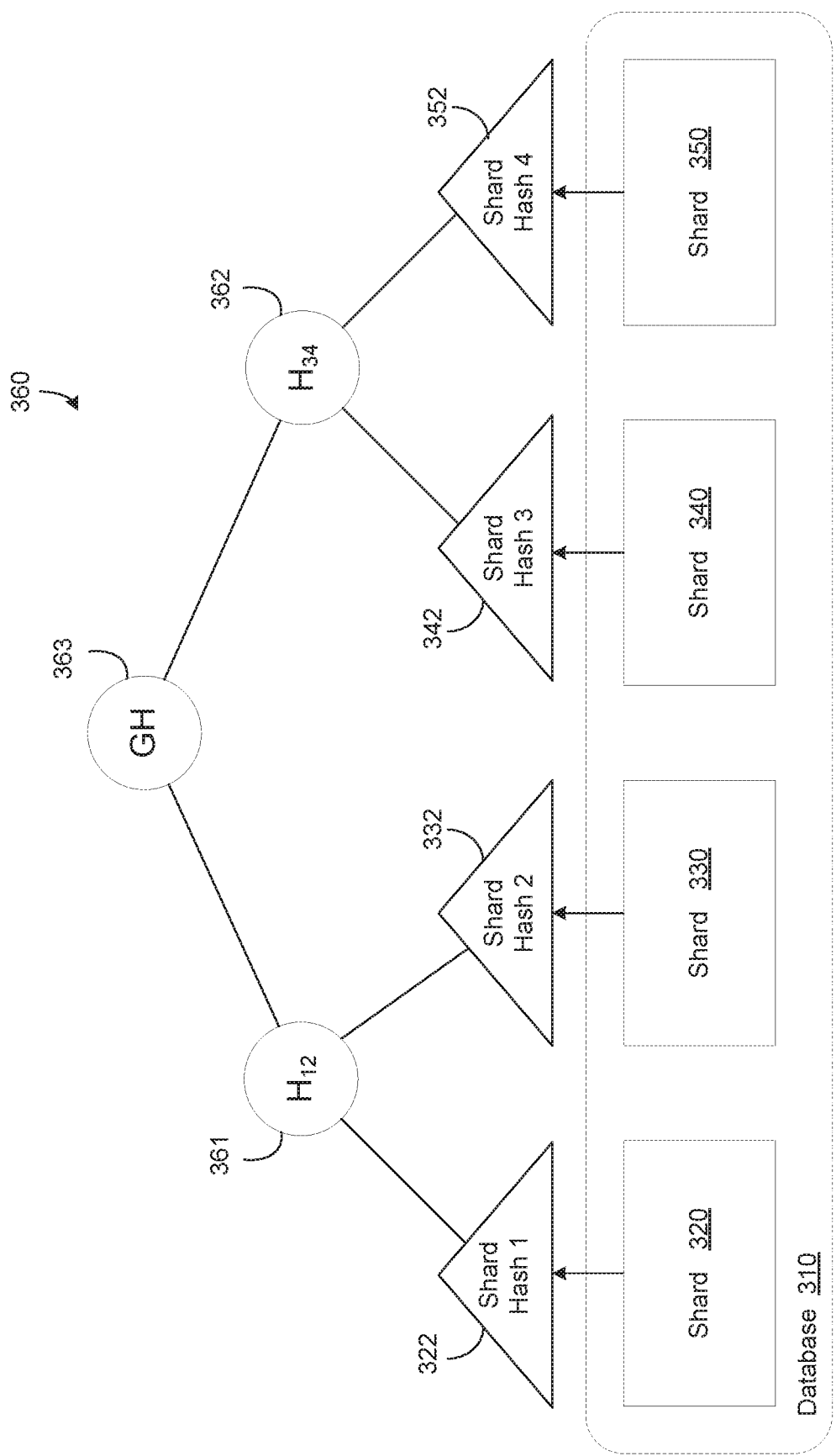
FIG. 3 is a diagram illustrating a process of generating a global hash value from a sequence of local hash values according to example embodiments.

FIG. 3 illustrates a process 300 of generating a global hash value from a sequence of local hash values according to example embodiments. When a data object is spread/replicated across multiple different shards of the database, the data object has multiple hashes (corresponding to the multiple shards) that represent the data object. In order to generate a single identifier of the data object, the example embodiments may create a global hash by combining the shard hashes in sequence, and rolling the shard hashes up using a hash tree until only one root hash remains. Therefore, the example embodiments augment the local hash values generated from each shard into a global hash value representing the entire database with a single hash value.

In this example, a document is stored on four differ shards 320, 330, 340, and 350 of a database 310. During an initial storage of the document, a shard hash of each shard where the document is stored may be generated resulting in a sequence of hashes. For example, a hash of shards 320, 330, 340, and 350, may be hashed using hash trees, or the like. The shards 320-350 are not limited in storage architecture. For example, the shards 320-350 may have a log-structured merge-tree format, a b-tree format, and the like. A hash value may be generated for each shard 320-350, individually. The result is a sequence of shard hash values 322, 332, 342, and 352 from shards 320, 330, 340, and 350, respectively. For example, each shard hash value 322-352 may have its own hash value that is separate from the other hash values of the other shards.

According to various embodiments, the database may combine the sequence of shard hash values 322, 332, 342, and 352 into a global hash value (i.e., root hash value 363) using a hash tree such as a Merkle tree 360. The root hash 363 represents a state of the database 310 and provides cryptographic proof of the document within the different shards 320-350 of the database 310. The shard hash values 322 and 332 may be combined and hashed (rolled-up) in a Merkle Tree 360 to generate an intermediate hash value 361. Likewise, the shard hash values 342 and 352 may be combined and hashed to generate an intermediate hash value 362. Next, the intermediate hash values 361 and 362 may be combined and hashed to generate the root hash value 363. The root hash value 363 may be the global hash identifier of the document.

Figure 4:
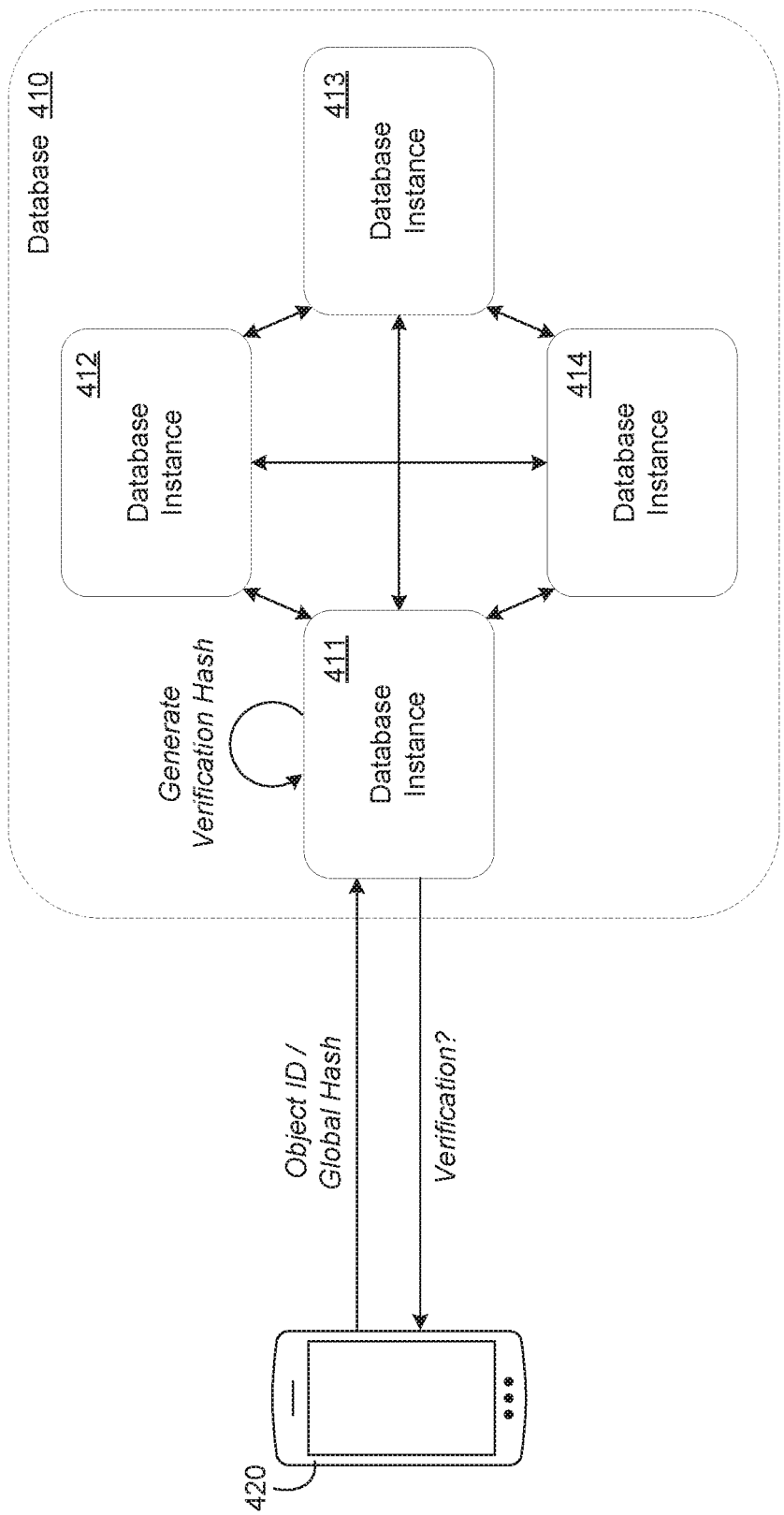
FIG. 4 is a diagram illustrating a process of verifying a data object based on a global hash according to example embodiments.

FIG. 4 illustrates a process 400 of verifying a data object based on a global hash according to example embodiments. In this example, a database 410 may verify that a data object is stored on the database 410. For example, the database 410 can provide cryptographic proof that a data object is stored on the database even when the data object is replicated across multiple shards of the database. Referring to FIG. 4, a client 420 generates a verification request for a data object (not shown) that has been previously stored on the database 410. For example, the verification request may include an identifier of the data object and a global hash value of the data object.

The database 410 includes a plurality of database server instances 411, 412, 413, and 414. Any of the database server instances 411, 412, 413, and 414, may receive the request and may verify the data object. The database server instances 411, 412, 413, and 414 may communicate with each other and inform each of the other database server instances of the data objects that are stored therein. For example, a data object may have a unique identifier (object ID) that identifies the data object uniquely on the database. Each database server instance storing the data object may keep a record of the object ID of the data object.

In FIG. 4, the client 420 requests verification of an object from database server instance 411. In response, the database server instance 411 identifies which shards on the database 410 store the data object. For example, the database server instance 411 may send a request to each database server instance 412-414, which respond with information identifying whether the data object is stored therein. When the database server instance 411 has identified which shards (database server instances) where the data object is stored, the database server instance 411 can retrieve the local shard hash values from the database server instances. Then, the database server instances 411 may reconstruct the global hash value for the data object based on the sequence of local shard hash values. If the reconstructed global hash value matches the global hash value received from the client 420, the database knows the data object is verified.

Accordingly, the database server instance may identify the shard where the data object is stored. Each database server instance may contain the Merkle tree but not the actual data. In response to receiving a query, a database server instance may determine whether/which servers contain the data object based on the ID of the data object. Thus, the database server instance may look up the local hash values of the shards involved in storing the document based on the document ID. Then, the database server instance may put the local hash values into a Merkle tree which gets rolled up into a global hash (single hash value) that represents a state of the data object across the entire database.

Figure 5:
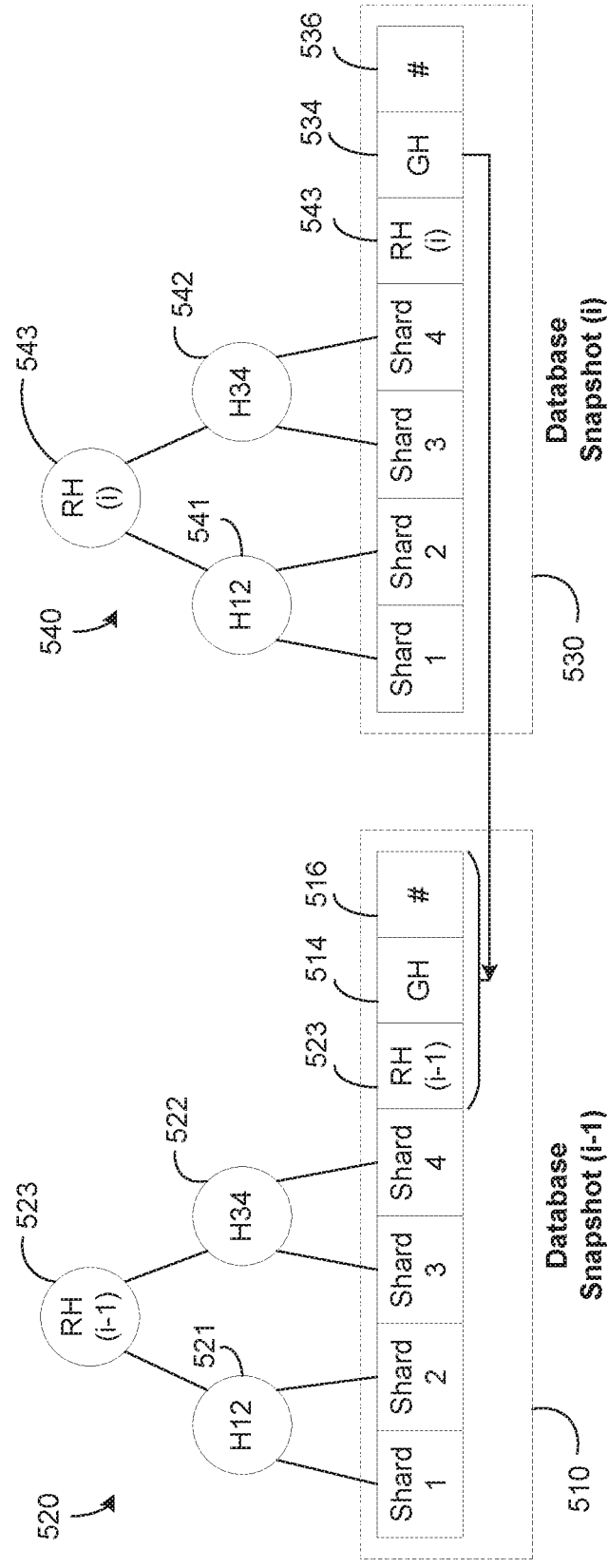
FIG. 5 is a diagram illustrating a process of cryptographically linking global hashes according to example embodiments.

FIG. 5 illustrates a process 500 of cryptographically linking global hashes according to example embodiments. For example, the database may periodically capture a snapshot of a state of the database and store the snapshot in a block, file, memory, etc. In this example, the global hash value representing the hashed state of the state of the database may also be used to cryptographically link the global hash of a current snapshot to a global hash of an immediately previous global hash. For example, the global hash value of the previous snapshot may be embedded within the global hash value of a current snapshot, however, embodiments are not limited thereto and other possible hash calculations are possible.

Referring to FIG. 5, a snapshot 510 includes a root hash value 523 that is generated by hashing the state of four shards of the database, and rolling the shard hashes up into intermediate hash values 521 and 522, and then rolling the intermediate hashes 521 and 522 up into a root hash 523 using a hash tree 520. The rolling-up process may generate a hash value based on a combination of hash values. For example, the intermediate hash value 521 may be generated by combining hash values for shard 1 and shard 2, and generate a new hash value (intermediate hash value 521) using predefined hash function. In addition, the snapshot 510 may include a global hash value 514 generated based on the root hash value 523 of the snapshot 510, a global hash of an immediately previous snapshot (not shown), and a number value of the previous snapshot within the database.

Meanwhile, a snapshot 530 includes a root hash value 543 that is generated by hashing the state of four shards of the database again, and rolling the shard hashes up into intermediate hash values 541 and 542, and then rolling the intermediate hashes 541 and 542 up into a root hash 543 using a hash tree 540. 4 In addition, the snapshot 520 may include a global hash value 534 generated based on the root hash value 543 of the snapshot 520, the global hash value 514 of the previous snapshot 510, and a number value 516 of the snapshot 510 within the database. Thus, the global hash value 534 may cryptographically link together the current snapshot 520 with the immediately previous snapshot 510 by embedding a value of the global hash value 514 of the previous snapshot 510 within the global hash value 534 of the current snapshot 520.

It should also be appreciated that alternative methods may be used to calculate the global hash value. For example, the global hash value may be generated without embedding the global hash of the previous snapshot into the global hash value of the current snapshot. In this alternative example, each time a snapshot is created, the snapshot may include a previous calculated global hash value of a previous snapshot, a current global hash value, the shard hashes of the current snapshot, and the number of the snapshot, as well as a signature.

Figure 6:
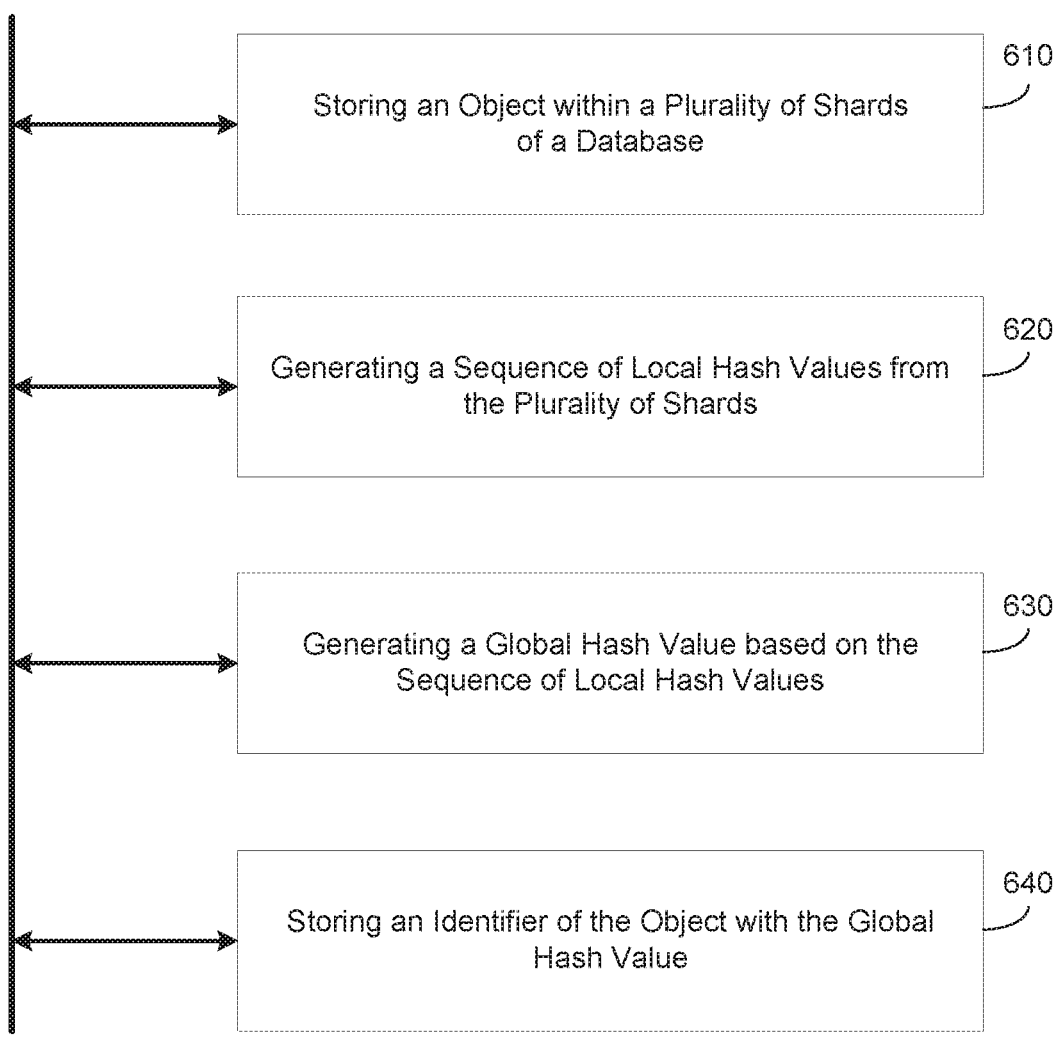
FIG. 6 is a diagram illustrating a method of generating a global hash value for a data object according to example embodiments.

FIG. 6 illustrates a method 600 of generating a global hash value for a data object according to example embodiments. For example, the method 600 may be performed by a controller, a program, a processor, a node, etc., and implemented within a database such as a horizontally partitioned database, etc. In 610, the method may include storing an object across a plurality of shards of a database. For example, the object may include a document, a file, a media file, a table, a field, a byte, and the like. For example, the storing may include storing a copy of the object in each of the plurality of shards of the database. As another example, the storing may include breaking-up the object into a plurality of sub-parts and dispersing the sub-parts across different shards.

In 620, the method may include generating a sequence of local hash values from the plurality of shards based on respective object content stored locally within the plurality of shards. For example, a local hash value may be generated for each shard based on the content that is stored within the shard. As one example, a hash tree may be constructed and used to generate a hash value that represents the local hash of the shard. Here, data objects may be hashed and assigned to leaf nodes in the hash tree. As an example, the shard may store data in a format of one of a binary hash tree structure or a b-tree structure. The hash tree structure may be rolled-up until a root hash remains. The root hash may be used as the local hash value of the shard.

In 630, the method may include converting the sequence of local hash values from the plurality of shards into a global hash value for the database. The hash values from the shards where the data object is stored may be combined in sequence, and assigned to nodes of a hash tree such as a Merkle tree, etc. Here, the database may rollup the hash tree until a root hash remains. The root hash may be used as the global hash value. In 640, the method may include storing an identifier of the object paired with the global hash value in the database. In some embodiments, the converting may include assigning the sequence of local hash values to leaf nodes of a Merkle tree, respectively, and determining a root hash value of the Merkle tree as the global hash value for the database.

In some embodiments, the method may further include receiving a request to verify a previously stored object which includes a global hash value of the previously stored object, and identifying a subset of shards in the database where the previously stored object is stored. In some embodiments, the method may further include reconstructing a global hash value for the previously stored object based on a sequence of local hash values of the subset of shards, and verifying that the reconstructed global hash value matches the received global hash value.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
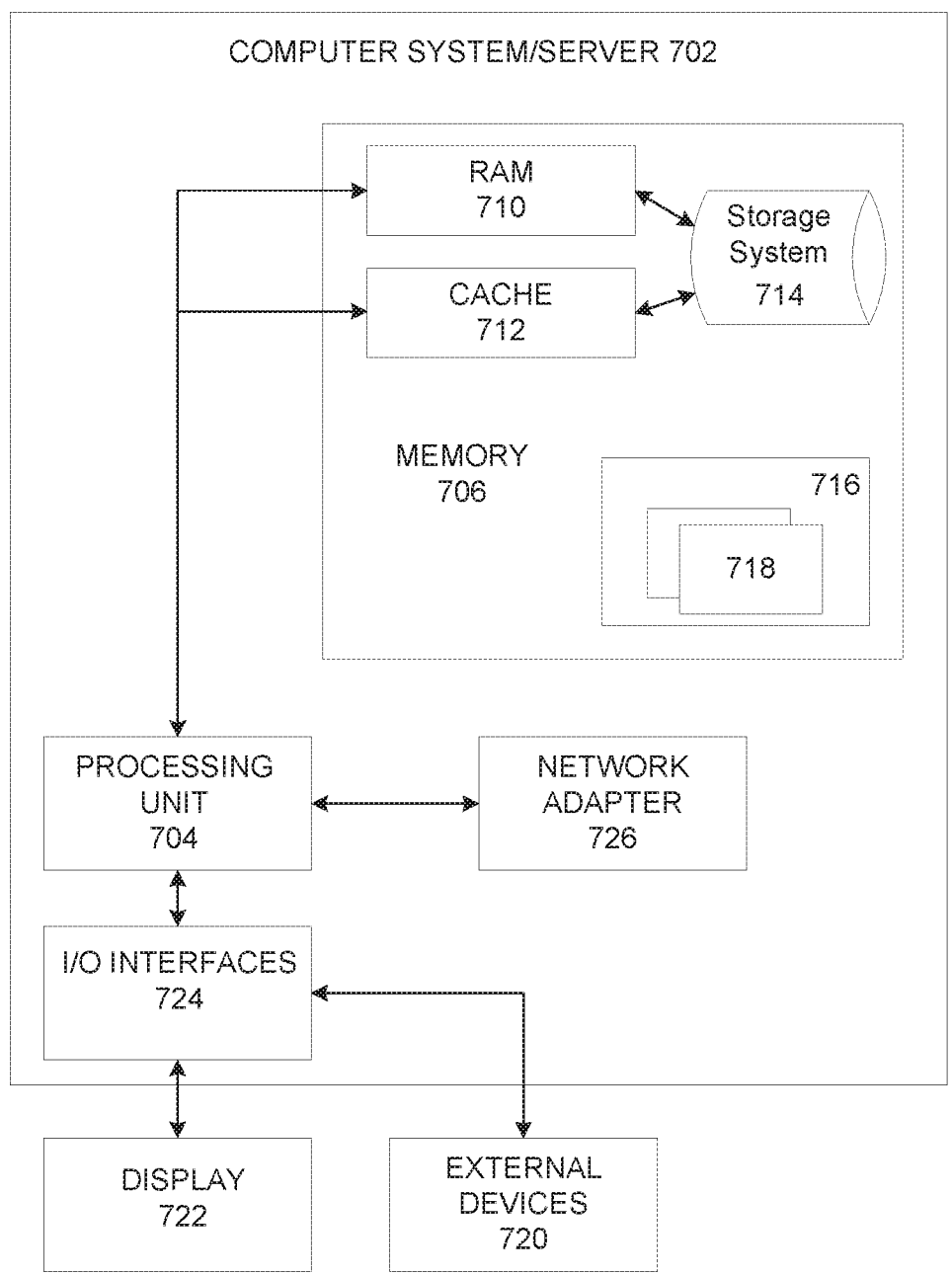
FIG. 7 is a diagram illustrating a computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove. For example, the computing node 700 may be a network server of a larger enterprise network that connects multiple user workstations to the Internet, a private network, or the like.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units (processor) 704, a system memory 706, and a bus that couples various system components including the system memory 706 to the processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724 (which may be referred to herein as an output and/or an input). Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

According to various embodiments, the processor 704 may receive a request associated with a key-value pair stored in a database. In this example, the database may include a key-value database that includes a key-value store. The request may be received from an application that is connected to the computing system 702 via a network (network adapter 726). As another example, the request may be provided internally such as from the processor 704 detecting a change to a key-value pair, etc.

The processor 704 may determine whether a state of the key-value pair has changed since a most recently received request. For example, the processor 704 may compare a timestamp of a block including the key-value pair with a current timestamp associated with the key-value pair to determine whether the value of the key-value pair has changed since it was last recorded on the blockchain. In response to a determination that the state of the key-value pair has changed, the processor 704 may generate a data block that includes a changed state of the key-value pair and add the generated data block to a hash-linked chain of data blocks.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An apparatus, comprising:
a database partitioned into a plurality of shards; and
a hardware-implemented processor configured to:
store a plurality of fragments of an object across a subset of shards of the plurality of shards, wherein each fragment of the plurality of fragments is stored in a respective shard of the subset of shards;
assign each fragment of the plurality of fragments stored in the respective shard to a corresponding hash tree, of a plurality of hash trees, associated with the respective shard;
generate a first local hash value for each shard of the subset of shards based on the assignment of each fragment of the plurality of fragments;
combine the first local hash value of each shard of the subset of shards into a first sequence to generate a plurality of intermediate hash values;
roll up the plurality of intermediate hash values via a Merkle tree to generate a first root hash value for the object;
at a first time, generate a first snapshot of the database, wherein the first snapshot comprises the first root hash value and a first global hash value associated with the first root hash value;
at a second time later than the first time:
combine a second local hash value of each shard of the subset of shards into a second sequence to generate a second root hash value for the object;
generate a second global hash value based on the second root hash value, the first global hash value of the first snapshot, and a number value of the first snapshot; and
generate a second snapshot of the database, wherein the second snapshot comprises the second root hash value and the second global hash value, and
the second snapshot is cryptographically linked to the first snapshot based on the second global hash value.

2. The apparatus of claim 1, wherein a storage format of each shard of the subset of shards comprises one of a log-structured merge tree or a b-tree.

3. The apparatus of claim 1, wherein the hardware-implemented processor is further configured to:
hash a plurality of key-value pairs stored in each shard of the subset of shards, wherein
the plurality of key-value pairs in each shard of the subset of shards is associated with a respective fragment of the plurality of fragments; and
assign at least one hashed key-value pair of the plurality of hashed key-value pairs to a respective leaf node of a plurality of leaf nodes of the corresponding hash tree.

4. The apparatus of claim 1, wherein the hardware-implemented processor is further configured to:
assign the first local hash value of each shard of the subset of shards to a respective leaf node of a plurality of leaf nodes of the Merkle tree; and
determine a root hash value of the Merkle tree as the first root hash value for the object based on the assignment of the first local hash value of each shard of the subset of shards.

5. A method, comprising:
storing an object within a database partitioned into a plurality of shards, wherein
the storing of the object comprises storing each fragment of a plurality of fragments of the object in a respective shard of a subset of shards of the plurality of shards of the database;

assigning each fragment of the plurality of fragments stored in the respective shard to a corresponding hash tree, of a plurality of hash trees, associated with the respective shard;
generating a first local hash value for each shard of the subset of shards based on the assigning of each fragment of the plurality of fragments;
combining the first local hash value of each shard of the subset of shards into a first sequence to generate a plurality of intermediate hash values;
rolling up the intermediate hash values via a Merkle tree to generate a first root hash value for the object;
at a first time, generating a first snapshot of the database, wherein the first snapshot comprises the first root hash value and a first global hash value associated with the first root hash value;
at a second time later than the first time:
combining a second local hash value of each shard of the subset of shards into a second sequence to generate a second root hash value for the object;
generating a second global hash value based on the second root hash value, the first global hash value of the first snapshot, and a number value of the first snapshot; and
generating a second snapshot of the database, wherein the second snapshot comprises the second root hash value and the second global hash value, and
the second snapshot is cryptographically linked to the first snapshot based on the second global hash value.

6. The method of claim 5, wherein a storage format of each shard of the subset of shards comprises one of a log-structured merge tree or a b-tree.

7. The method of claim 5, further comprising:
hashing a plurality of key-value pairs stored in each shard of the subset of shards, wherein
the plurality of key-value pairs in each shard of the subset of shards is associated with a respective fragment of the plurality of fragments; and
assigning at least one hashed key-value pair of the plurality of hashed key-value pairs to a respective leaf node of a plurality of leaf nodes of the corresponding hash tree.

8. The method of claim 5, further comprising:
assigning the first local hash value of each shard of the subset of shards to a respective leaf node of a plurality of leaf nodes of the Merkle tree; and
determining a root hash value of the Merkle tree as the first root hash value for the object based on the assigning of the first local hash value of each shard of the subset of shards.

9. A non-transitory computer-readable medium comprising instructions that, when executed by a processor, cause the processor to perform:
storing an object within a database partitioned into a plurality of shards, wherein
the storing of the object comprises storing each fragment of a plurality of fragments of the object in a respective shard of subset of shards of the plurality of shards of the database;
assigning each fragment of the plurality of fragments stored in the respective shard to a corresponding hash tree, of a plurality of hash trees, associated with the respective shard;
generating a first local hash value for each shard of the subset of shards based on the assigning of each fragment of the plurality of fragments;
combining the first local hash value of each shard of the subset of shards into a first sequence to generate a plurality of intermediate hash values;
rolling up the intermediate hash values via a Merkle tree to generate a first root hash value for the object;
at a first time, generating a first snapshot of the database, wherein the first snapshot comprises the first root hash value and a first global hash value associated with the first root hash value;
at a second time later than the first time:
combining a second local hash value of each shard of the subset of shards into a second sequence to generate a second root hash value for the object;
generating a second global hash value based on the second root hash value, the first global hash value of the first snapshot, and a number value of the first snapshot; and
generating a second snapshot of the database, wherein the second snapshot comprises the second root hash value and the second global hash value, and
the second snapshot is cryptographically linked to the first snapshot based on the second global hash value.

10. The non-transitory computer-readable medium of claim 9, wherein the instructions further cause the processor to perform:
hashing a plurality of key-value pairs stored in each shard of the subset of shards, wherein
the plurality of key-value pairs in each shard of the subset of shards is associated with a respective fragment of the plurality of fragments; and
assigning at least one hashed key-value pair of the plurality of hashed key-value pairs to a respective leaf node of a plurality of leaf nodes of the corresponding hash tree.

11. The non-transitory computer-readable medium of claim 9, wherein the instructions further cause the processor to perform:
assigning the first local hash value of each shard of the subset of shards to a respective leaf node of a plurality of leaf nodes of the Merkle tree; and
determining a root hash value of the Merkle tree as the first root hash value for the object based on the assigning of the first local hash value of each shard of the subset of shards.

* * * * *